Nov. 29, 1960     H. P. WOODS     2,962,220
ROTARY LAWN SPRINKLER

Filed Jan. 3, 1958     3 Sheets-Sheet 1

INVENTOR.
HARRY P. WOODS
BY
McMorrow, Berman + Davidson
ATTORNEYS

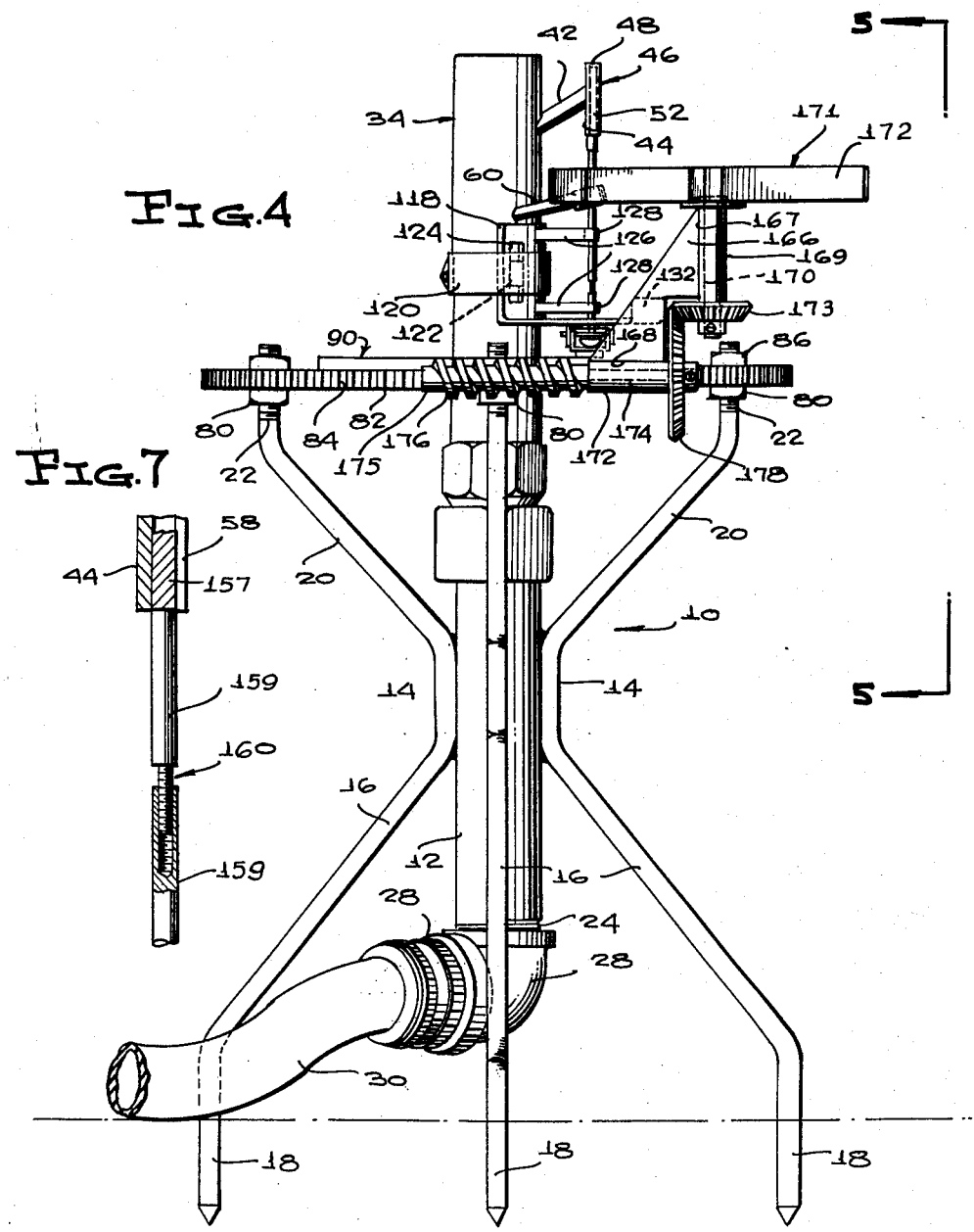

Nov. 29, 1960        H. P. WOODS        2,962,220
ROTARY LAWN SPRINKLER
Filed Jan. 3, 1958        3 Sheets-Sheet 3
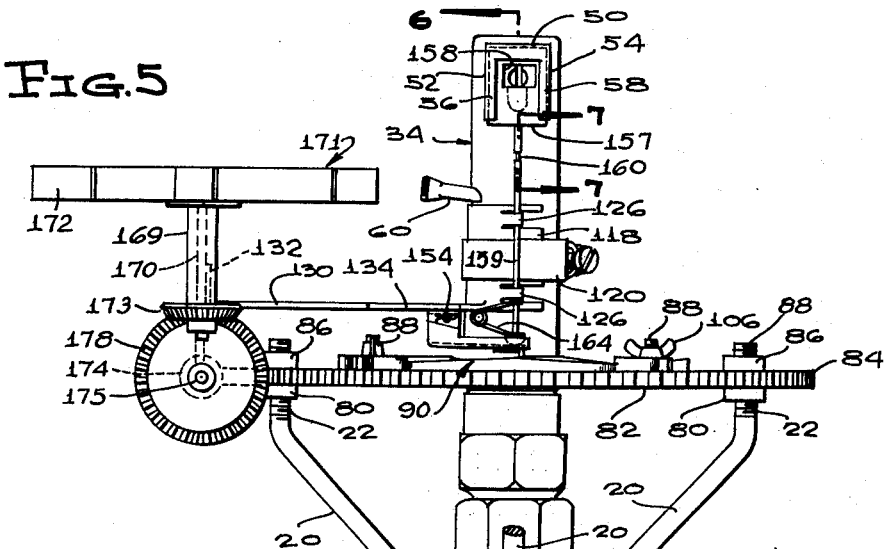
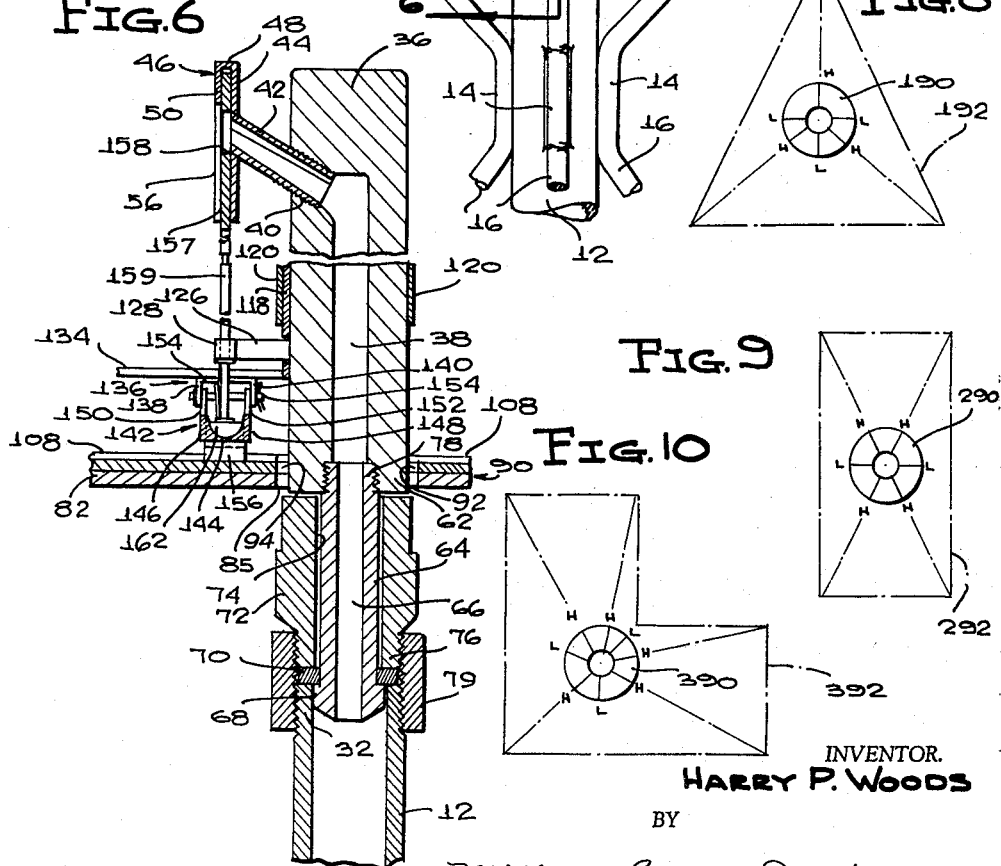
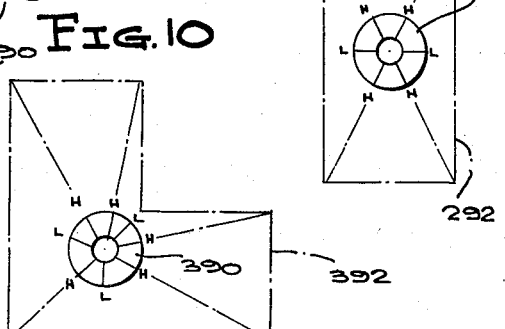
INVENTOR.
HARRY P. WOODS
BY
McMorrow, Berman & Davidson
ATTORNEYS United States Patent Office 2,962,220
Patented Nov. 29, 1960

2,962,220

ROTARY LAWN SPRINKLER

Harry P. Woods, P.O. Box 511, Ridgeland, S.C.

Filed Jan. 3, 1958, Ser. No. 707,048

2 Claims. (Cl. 239—97)

This invention relates to an irrigation device and, more specifically, the invention pertains to a rotary lawn sprinkler especially designed to sprinkle water over the ground in certain pre-selected patterns.

One of the primary objects of this invention is to provide a lawn sprinkler of the rotary type with means for uniformly spraying the water in predetermined noncircular areas in such a manner as to obtain the maximum benefit of the available water supply.

Another object of this invention is to provide a rotary sprinkling device with pattern sprinkling control elements which may be quickly and easily interchanged to obtain variations in the sprinkling pattern.

A still further object of this invention is to provide a sprinkling device with ground engaging means to preclude the lateral displacement thereof or other movement, the ground engaging means including means for establishing constant alignment of the sprinkler with respect to the area to be irrigated in order to obtain the desired sprinkling pattern.

A still further object of this invention is to provide a rotary sprinkler of the type referred to supra, which will irrigate straight sides and sharp corners while at the same time supplying substantially the same amount of water per square foot to all of the area to be watered.

It is a still further object of this invention to provide a water sprinkler of the type generally described above which makes maximum use of the water source in order to obtain the optimum of economy in operation.

It is still another object of this invention to provide a rotary lawn sprinkler which is designed for easy and quick assembly and disassembly.

This invention contemplates, as a still further object thereof, the provision of a lawn sprinkler of the type referred to in general above, the sprinkler being non-complex in construction and assembly, inexpensive to manufacture, and durable in use.

Other and further objects and advantages of the instant invention will become more evident from a consideration of the following specification when read in conjunction with the annexed drawings, in which:

Figure 4 is a side elevational view of the rotary lawn sprinkler illustrated in Figure 1;

Figure 5 is a second side elevational view of the rotary lawn sprinkler, Figure 5 being taken substantially on the vertical plane of line 5—5 of Figure 4, looking in the direction of the arrows;

Figure 6 is a vertical longitudinal detail cross-sectional view taken substantially on the vertical plane of line 6—6 of Figure 5, looking in the direction of the arrows;

Figure 7 is an enlarged detail cross-sectional view taken substantially on the vertical plane of line 7—7 of Figure 5, looking in the direction of the arrows, and illustrating the details of the adjustment means for the valve operating stem;

Figure 8 is a top plan view of a sprinkling pattern control device for obtaining a substantially triangular sprinkling pattern as illustrated therein;

Figure 9 illustrates a sprinkling pattern control device for obtaining an elongated substantially rectangular sprinkling pattern; and Figure 10 illustrates a sprinkling pattern control device for obtaining a substantially L-shaped sprinkling pattern.

Figure 1:
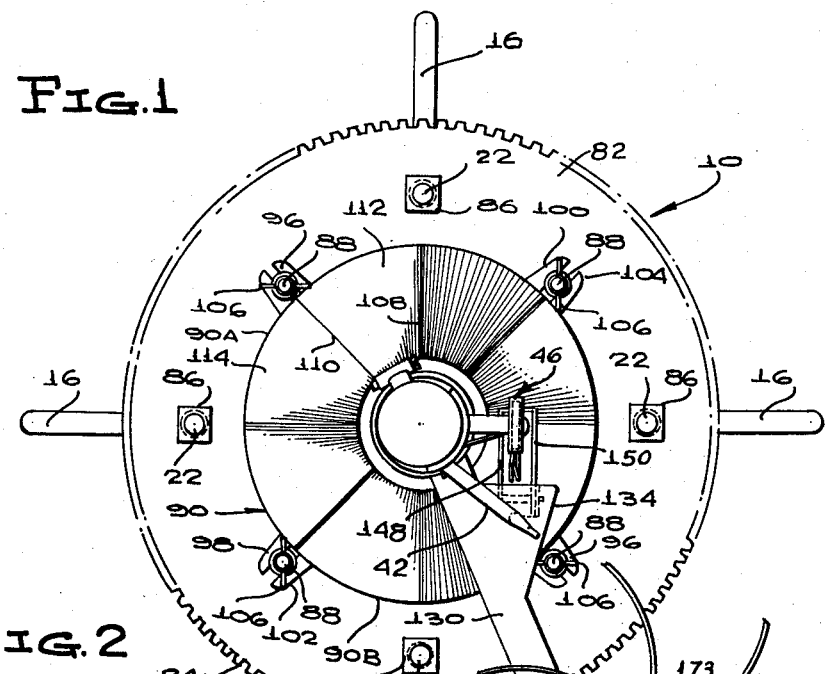
Figure 1 is a top plan view of a rotary lawn sprinkler constructed in accordance with the present invention.

Referring now more specifically to the drawings, reference numeral 10 designates, in general, a rotary sprinkler device constructed in accordance with the teachings of the present invention. The sprinkler 10 is seen to comprise an elongated substantially hollow rigid tubular conduit 12 to which are externally connected the bights 14 from one end of which projects a plurality of downwardly diverging standards 16, the lower ends of the latter terminating, respectively, in offset normally vertical sharpened ground engaging tines 18. The other ends of the bights 14 are integral with a plurality of upwardly and outwardly diverging support arms 20 each of which terminates in offset normally vertical threaded end extensions 22. The lower end of the conduit 12 is externally threaded at 24 to threadedly receive one end of an elbow coupler 26, the other end of the latter being detachably connected at 28 (by conventional means) with one end of a flexible conduit or hose 30. The other end of the hose 30 is adapted for connection with a suitable source (not shown) of water under pressure. The upper end 32 of the conduit 12 is externally threaded to serve a function to be described.

Reference numeral 34 denotes, in general, a sprinkler head which includes an elongated substantially cylindrical main body portion 36 (see Figure 6) having an axially extending bore 38 extending inwardly from one end thereof and which terminates at a point adjacent to but spaced from its other opposed end. As seen in Figure 6, the inner terminal end of the bore 38 is in open communication with the inner end of an upwardly inclined internally threaded bore 40 which threadedly receives the inner end of a substantially hollow cylindrical jet sprinkler nozzle 42. The outer end of the nozzle 42 extends through an aperture formed in the substantially rectangular back plate 44 of a valve housing 46. A top wall 48 integral with the back plate 44 extends from the upper end thereof substantially perpendicular with respect thereto and from which depends a reverted flange 50 disposed in spaced substantially parallel relation relative to the back plate 44. The housing 46 includes a pair of laterally spaced, parallel and confronting end walls 52, 54, and a pair of laterally spaced substantially parallel and confronting front walls 56, 58 disposed parallel to the back plate 44 in spaced parallel relation relative thereto. One end of a water wheel driving jet nozzle 60 communicates with the bore 38 intermediate its ends and projects upwardly from the sprinkler head 34 at an acute angle with respect to the axis of the bore 38. The lower end 62 of the main body portion 36 is internally threaded to serve a function to be described.

Reference numeral 64 connotes an elongted substantially hollow tubular insert having an axially extending bore 66. One end of the insert is formed with an enlarged circumferential boss or shoulder 68 against which seats a resilient gasket 70. An elongated substantially hollow cylindrical tubular connector element 72 having a centrally positioned axially extending bore 74 loosely surrounds the insert 64 and is provided with a threaded lower end 76 which seats against the gasket 70. As is seen in Figure 6, the upper end 78 of the insert 64 extends beyond the upper end of the connector element 72 and is threaded for reception within the threaded lower end 62 of the sprinkler head 34 with the adjacent juxtaposed ends of the connector element 72 and the sprinkler head 34 being slightly spaced from each other.

The enlarged boss or shoulder 68 of the insert 64 is inserted within the threaded upper end 32 of the conduit 12 until the gasket 70 engages thereagainst. This brings the threaded upper end 32 of the conduit 12 into proximate spaced relation with respect to the threaded lower end 76 of the sprinkler head 34, and these threaded ends are connected together by means of a conventional coupler sleeve 79, the gasket 70 effecting a water tight seal therebetween.

Reference is now made to Figures 4 and 5 wherein reference numerals 80 denote adjustable nuts which are mounted on the threaded end extensions 22 of the support arms 20. A circular gear wheel 82 having circumferential teeth 84 is formed with a central opening 85 to loosely receive the lower end of the sprinkler head 34 therethrough. The gear wheel 82 is provided with a plurality of radially spaced apertures corresponding to the spacing between the threaded end extensions 22 of the arms 20 and receive the extensions therethrough, the gear wheel 82 resting and being supported on the adjustment nuts 80. As is seen in the drawings, the end extensions 22 project above the upper side of the gear wheel 82 and receive thereon securing or lock nuts 86. A plurality of radially spaced bolts 88 are fixedly secured to the gear wheel 82 and extend thereabove to serve a purpose set forth in detail below.

Reference numeral 90 (see Figures 1, 2, 4, 5 and 6) generally designates any one of a plurality of control discs for controlling the pattern of the area to be sprinkled by the water sprinkler 10. Each of the control discs 90 includes a pair of semi-circular members 90A, 90B each of which are provided with a centrally located semi-circular cutout 92, 94, respectively, which are adapted to loosely engage around the sprinkler head 34 (see Figures 1, 2 and 6), and the semi-circular members 90A, 90B are provided, respectively, with one or more radially extending bifurcated lugs 96 which are adapted to engage opposite sides of the bolts 88. The semi-circular member 90A is formed with radially extending tabs 98, 100 adjacent oposite ends of the diameter thereof, the tabs 98, 100 being disposed in spaced confronting relation with respect to the radially extending tabs 102, 104 at opposite ends of the diameter of the semi-circular member 90B. As is seen in Figure 1, the tabs 98, 102 and 100, 104 engage against opposite sides of other ones of the bolts 88, and the lugs 96 and tabs 98, 100, 102 and 104 are releasably secured on the gear wheel 82 and to the bolts 88 by means of wing nuts 106.

Figure 3:
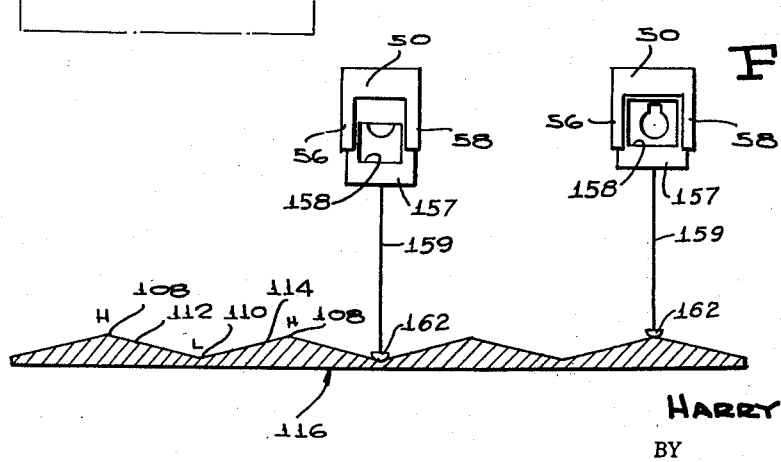
Figure 3 is a developed cross-sectional view of the cam track of the sprinkling pattern control device illustrated in Figures 1 and 2, Figure 3 also schematically illustrating two maximum positions of the spray control valve relative to the spray nozzle.

The control disc 90 is formed with alternating radial crests and depressions 108, 110, respectively, bearing the legends "High" or "Low," respectively, as seen in Figure 3 or, optionally, the reference letters "H" or "L." The areas between each adjacent pair of crests 108 include a pair of downwardly converging sides 112, 114 which form a cam track 116 illustrated in developed form in Figure 3.

Reference numeral 118 indicates an arcuately shaped bracket which engages against the sprinkler head 34 and is disposed below the nozzles 42 and 60. The bracket 118 is surrounded by and is held against the sprinkler head 34 by means of a conventional split band clamp 120 having an inwardly projecting key 122 that is received within a vertically elongated substantially rectangular slot 124 formed in the bracket 118. The bracket 118 is stamped out to provide a pair of vertically spaced and substantially parallel arms 126 each of which terminate in vertically aligned substantially hollow cylindrical valve stem guide members 128. Adjacent its lower end, the bracket 118 is constructed with an elongated radially projecting strut 130 which terminates at its outer end in a substantially vertical upright flange 132. Adjacent its inner end, the strut is formed with a laterally projecting integral gusset plate 134 to the under side of which is fixedly secured an inverted substantially U-shaped hanger 136 having a pair of depending spaced and substantially parallel side arms 138, 140 (see Figure 6).

Reference numeral 142 designates an elongated substantially U-shaped channel member having a bight 144 from the longitudinally extending marginal edges of which upwardly project a pair of laterally spaced side walls 146, 148. One adjacent pair of ends of the side walls 146, 148 terminate in ears 150, 152, respectively, which are received between the side arms 138, 140 and are pivotally connected thereto on a pivot pin 154. Adjacent the other end of the channel member 142 a cam follower 156 is rigidly secured to the bight 144 and depends therefrom for engagement with the upper side of the control disc 90.

A substantially rectangular valve 157 is mounted for reciprocation within the valve housing 46 and is provided with a central rectangular opening 158 adapted for movement into and out of registry with the discharge end of the sprinkler nozzle 42. To the lower end of the valve 157 is fixedly secured an elongated substantially cylindrical valve operating stem 159 interrupted intermediate its ends by conventional adjustment means 160 for adjusting the axial length thereof. The valve operating stem 159 is mounted for reciprocation within the valve stem guide members 128, and the lower end of the stem 159 terminates in an arcuately shaped enlarged head 162 which engages against the bight 144 of the channel member 142. Interposed between the lower end of the lowermost one of the valve stem guide members 128 and the head 162 is resilient means 164 which constantly biases the head 162 downwardly against the bight 144.

Reference numeral 166 denotes a substantially triangular plate having a side 167 perpendicular to its base 168. To the side 167 is fixedly secured a vertically extending bushing 169 in which is rotatably journalled a shaft 170 which projects above and below the opposed ends of the bushing 169. A turbine wheel 171 having impeller blades 172 is fixedly secured to the upper end of the shaft 170, and a bevel gear 173 is fixedly secured to the lower end thereof.

A second, horizontally extending, bushing 174 is rigidly secured to the base 168 and journals for rotation therein a shaft 175 of which one end terminates in a worm gear 176, and the other end thereof has fixedly secured thereto a beveled gear 178 which meshes with the gear 173.

The plate 166 is rigidly connected to the flange 132 with the worm gear 176 meshing with the gear teeth 84 of the gear wheel 82, and the arrangement and construction is such that the impeller blades 172 are disposed in the path of the water stream discharged from the nozzle 60.

Figure 2:
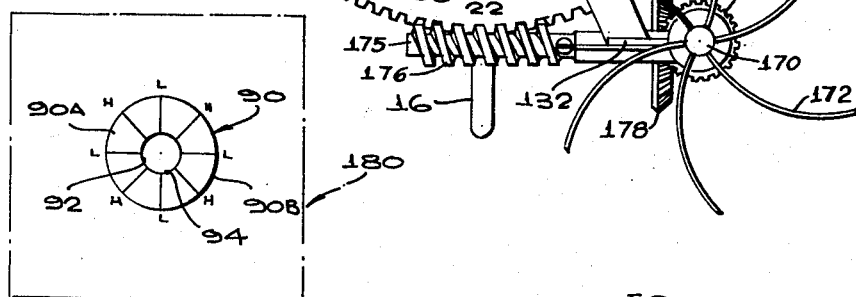
Figure 2 is a top plan view of one of the sprinkling pattern control devices and illustrating, in broken lines, the sprinkling pattern obtained from the use thereof with the rotary lawn sprinkler illustrated in Figure 1.

For the purpose of illustrating the operation of the above described sprinkler 10, let it be assumed that a substantially rectangular lawn plot, such as is indicated at 180 in Figure 2, is to be irrigated or sprinkled. The sprinkling device 10 is erected at substantially the center of the plot 180 and a control disc such as that as is indicated by reference numeral 90 is secured to the gear wheel 82 in the manner above described, the control disc 90 being disposed below and being engaged by the cam follower 156. In setting up the sprinkler 10, care must be taken in that the crests 108 of the disc 90 are directed towards the extreme corners of the plot 180. The hose 30 is now connected to the elbow connector 28 and to a source of water under pressure. The water now passes through the hose 30, the connector 28, conduit 12, insert 64 and into the head 34. The water discharges substantially simultaneously through the nozzles 42 and 60, and in the latter case the discharged water stream impinges against the turbine blades 172 which, in turn, effect rotation of the shaft 170, gear 173, gear 178, and the worm gear 176. With the worm gear in mesh with the gear teeth 84 of the gear wheel 82, and since the sprinkler head 34 and the insert 64 are free to rotate within the conduit 12 and the connector element 72, the sprinkler head 34 now turns about its longitudinally extending axis. As the head 34 turns or rotates about its axis, the strut 130 also turns in the same direction. The cam follower 156 now traces the cam track 116 and in so moving passes the crests 108 and depressions 110 in sequential order. The channel member 142 pivots downwardly and upwardly in response to the cam follower 156 and in so moving causes the valve operating stem 148 to reciprocate sequentially to effect movement of the valve 146 downwardly (towards its closed position) as is illustrated in the schematic representation at the left of Figure 3, or upwardly (towards its open position) as is schematically shown at the right hand side of Figure 3.

Thus, when the nozzle 42 is directed toward a remote corner of the plot 180, the valve 146 has moved upwardly to its fully open position. Then, as the head 34 turns to point the nozzle 42 towards the closer edges of the plot 180 the cam follower 156 traces downwardly the cam surface 112, gradually cutting down on the amount of water discharged from the nozzle 42, until the cam follower enters the depression 110. At this point, the head 34 has rotated 45 degrees. As the head 34 continues to rotate in the same direction, the cam follower 156 begins to gradually rise on the cam surface 114 to effect a gradual opening of the valve 146 until it (the cam follower) again reaches a crest 108 at which time the valve is again in its fully open position and the sprinkler head 34 has rotated a second 45 degrees. The nozzle 42 is now directed or aligned with a second one of the remote corners of the plot 180.

This sequence is continuously repeated so long as water under pressure is supplied to the sprinkler 10.

It should be observed at this point that the water stream for driving the turbine 171, after leaving the impellor blades 172 falls to the ground and is utilized in irrigating areas thereof immediately adjacent the sprinkler 10.

Various adjustments of the sprinkler 10 may be made through the simple expedient of adjusting the relative positions of the adjustment nuts 80. For example, a pair of adjacent nuts 80 could be threaded downwardly on the end extensions 22 below the position of the other pair of adjacent nuts 80 on the end extensions. This would permit a downward tilting of a portion of the gear wheel 82, it being assumed, of course, that the lock nuts 86 on the extensions 22 carrying the non-adjusted nuts 80 are loosened. Thus, as the spray nozzle travels above the low side of the gear wheel 82 the water discharged from the sprinkler nozzle 42 will be discharged for a shorter distance than when the spray nozzle 42 passes above the high side of the gear wheel 82 whereby still other sprinkling patterns may be obtained, or the same or similar adjustments could be made to level the gear 82 with respect to a horizontal plane.

In the embodiments of this invention illustrated in Figures 8, 9 and 10, the only departure from the above described first embodiment resides in the substitution of the pattern control discs 190, 290 or 390 for the control disc 90. In Figure 8, the disc 190 is formed with crests and depressions designated by reference numerals "H" and "L" so spaced and arranged as to sprinkle a substantially triangular plot 192; in Figure 9, the crests and depressions, again designated at "H" and "L" are so spaced as to effect the sprinkling of an elongated substantially rectangular plot 292; and, in Figure 10, the crests "H" and depressions "L" are disposed in such a manner as to sprinkle or irrigate a substantially L-shaped plot 392.

Obviously, by varying the arrangement of the crests and depressions formed in the control plate and/or changing the angle of the gear 82, other plots of ground having regular or irregular configurations may be economically sprinkled.

While the above specification has described this invention in the environment of lawns to be watered, it is deemed obvious to one skilled in this art that the present invention may be utilized in other fields of endeavor wherein a controlled sprinkler may be employed.

Having described and illustrated in detail a plurality of embodiments of this invention, it will be understood that the same are offered merely by way of example, and that this invention is to be limited only by the scope of the appended claims.

What is claimed is:

1. A fluid sprinkler comprising an elongated substantially hollow conduit having a pair of opposed open ends, means connected to said conduit intermediate its said ends for supporting said conduit in a normally upright position, a plurality of support arms having one of their respective ends fixedly secured to said conduit intermediate its said ends, the other ends of said support arms diverging upwardly and outwardly from said conduit, a centrally apertured gear wheel fixedly secured to and supported on said other ends of said arms, said conduit being coaxially aligned with said central aperture, an elongated substantially hollow cylindrical sprinkler head having a pair of opposed open and closed ends, said sprinkler head being rotatably supported on the upper open end of said conduit with the open end of said head in communication with said open upper end of said conduit, said head being freely rotatable within said central aperture, a control disc mounted on said gear wheel in concentric relation relative thereto and to said head, said head being freely rotatable in said disc and the latter having an upwardly facing cam surface, said head having a pair of vertically spaced nozzles projecting laterally therefrom above said disc, a strut projecting laterally from said head and having an end thereof fixedly secured to said head whereby said strut is rotatable therewith, the other end of said strut projecting across said gear wheel and disc in vertically spaced relation relative thereto, a turbine rotatably supported on said other end of said strut, said turbine being rotatable about a normally upright axis, a gear train connecting said turbine in driving relation with said gear wheel, said turbine having the blades thereof disposed in the fluid discharge path of one of said nozzles, a cam follower mounted on said strut and engaging said cam surface, said cam follower being pivotal about a normally horizontal axis, a valve housing including a back plate having an opening extending transversely therethrough, said back plate being fixedly secured to the other of said nozzles with said opening thereof in registry therewith, a substantially rectangular valve element having an opening extending transversely therethrough, said valve element being mounted for vertical reciprocation in said housing and being movable to shift said opening formed in said valve element into and out of registry with said opening formed in said back plate, a valve stem having an end thereof fixedly secured to said valve element and its other end depending from the latter and engaging said cam follower whereby pivotal movement of said cam follower causes said valve stem and consequently said valve element to reciprocate as said head is rotated, and means at the other open end of said conduit to connect said conduit with a source of fluid under pressure.

2. A fluid sprinkler comprising an elongated substantially hollow cylindrical conduit having a pair of opposed open ends, means connected to said conduit intermediate its said ends for supporting said conduit in a normally upright position, a connector device fixedly secured to said conduit at one of its said open ends for connecting said conduit with a source of fluid under pressure, a plurality of support arms having one of their respective ends fixedly secured to said conduit and their respective other ends diverging outwardly and upwardly therefrom, a gear wheel fixedly secured to and supported on said other ends of said support arms, said gear wheel having a central opening formed therein extending transversely therethrough in concentric relation relative to said conduit, an elongated hollow cylindrical connector element having one of its ends fixedly connected to the other end of said conduit and in open communication therewith, an elongated substantially hollow tubular insert disposed within said cylindrical conductor and having an end thereof projecting into said conduit, a fluid tight seal extending between said connector and said tubular insert, said insert being rotatable within said cylindrical connector and conduit, an elongated hollow cylindrical sprinkler head having a pair of opposed open and closed ends, means fixedly securing the open end of said head with the other end of said insert, said head extending loosely through said opening in said gear wheel, said head having formed therein a bore communicating with the interior thereof and inclined upwardly towards said closed end of said sprinkler head, a hollow cylindrical nozzle having one end thereof fixedly connected in said bore, said sprinkler head having a second nozzle projecting laterally therefrom and communicating at the inner end of the latter with the interior of the former, an elongated strut having an end thereof fixedly secured to said head for rotation therewith, the other end of said strut extending over said gear wheel in vertically spaced relation relative thereto, a control disc concentrically disposed relative to said head and fixedly secured to said gear wheel below said strut, said control disc having alternating crests and depressions on the exposed side thereof and forming a cam surface, a cam follower depending from said strut and being pivotal about a horizontal axis, said cam follower engaging said cam surface, a turbine supported on said strut for rotation about a normally vertical axis with the blades thereof disposed in the fluid discharge path of said second nozzle, a gear train connecting said turbine in driving relation with respect to said gear wheel whereby actuation of said turbine causes said head to rotate relative to said gear wheel, a valve housing having a back plate fixedly secured to the extreme outer end of the first of said nozzles and having an opening therethrough communicating with said first nozzle, a substantially rectangular valve having an opening therethrough, said valve being mounted for vertical reciprocation in said housing so that said opening formed therein may be moved into and out of registry with said opening formed in said back plate, and a valve stem having an end thereof fixedly secured to said valve and its other end depending therefrom for engagement with said cam follower whereby pivotal movement of said cam follower as it traces said cam surface will cause said valve to move said opening into and out of registry with said opening formed in said back plate.

References Cited in the file of this patent
UNITED STATES PATENTS

| | | |
|---|---|---|
| 757,160 | Vandervoort | Apr. 12, 1904 |
| 1,146,228 | Zint | July 13, 1915 |
| 1,491,253 | Barnes | Apr. 22, 1924 |
| 1,938,838 | Jacobson | Dec. 12, 1933 |
| 2,601,559 | Riblet | June 24, 1952 |